April 29, 1941. N. BORRESEN 2,240,435
THERMOSTAT VALVE
Filed July 2, 1937 2 Sheets-Sheet 1
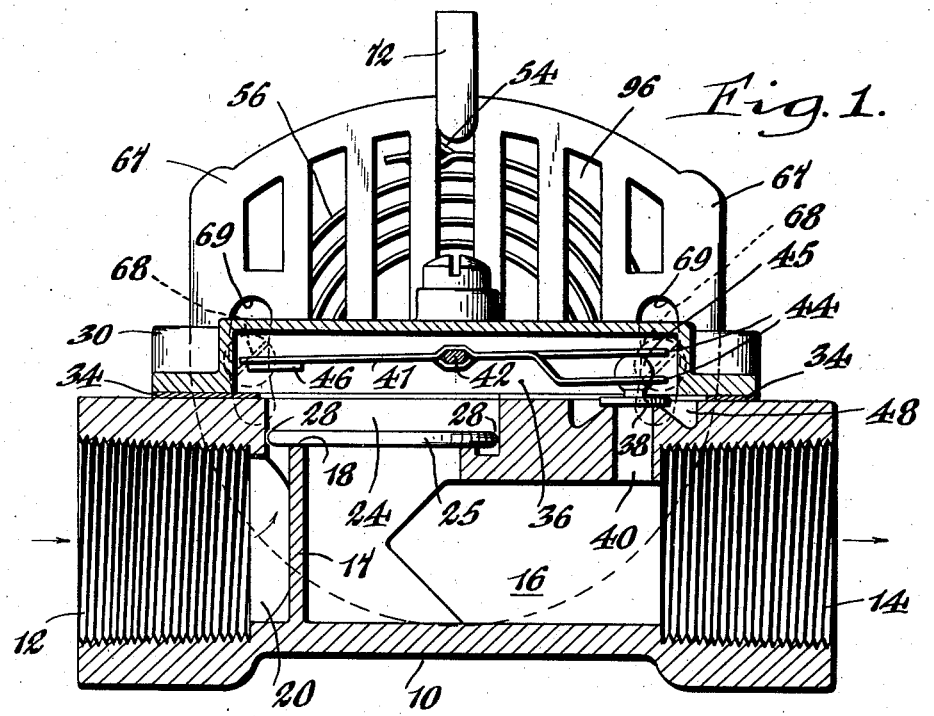
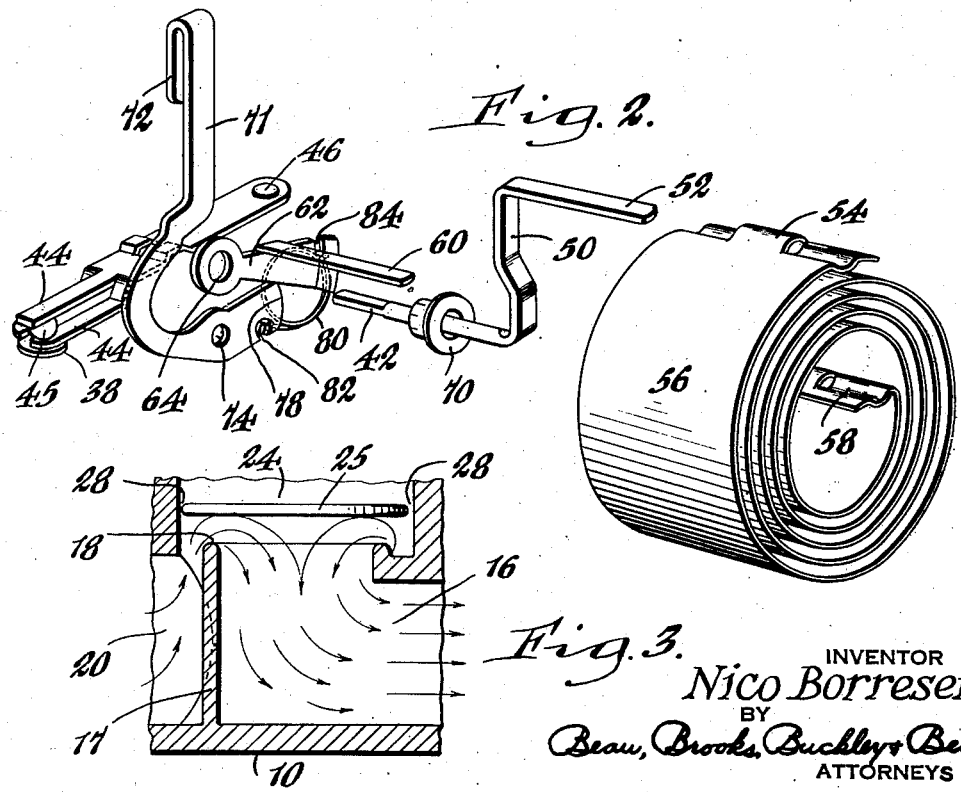
INVENTOR
Nico Borresen,
BY
Beau, Brooks, Buckley & Beau.
ATTORNEYS

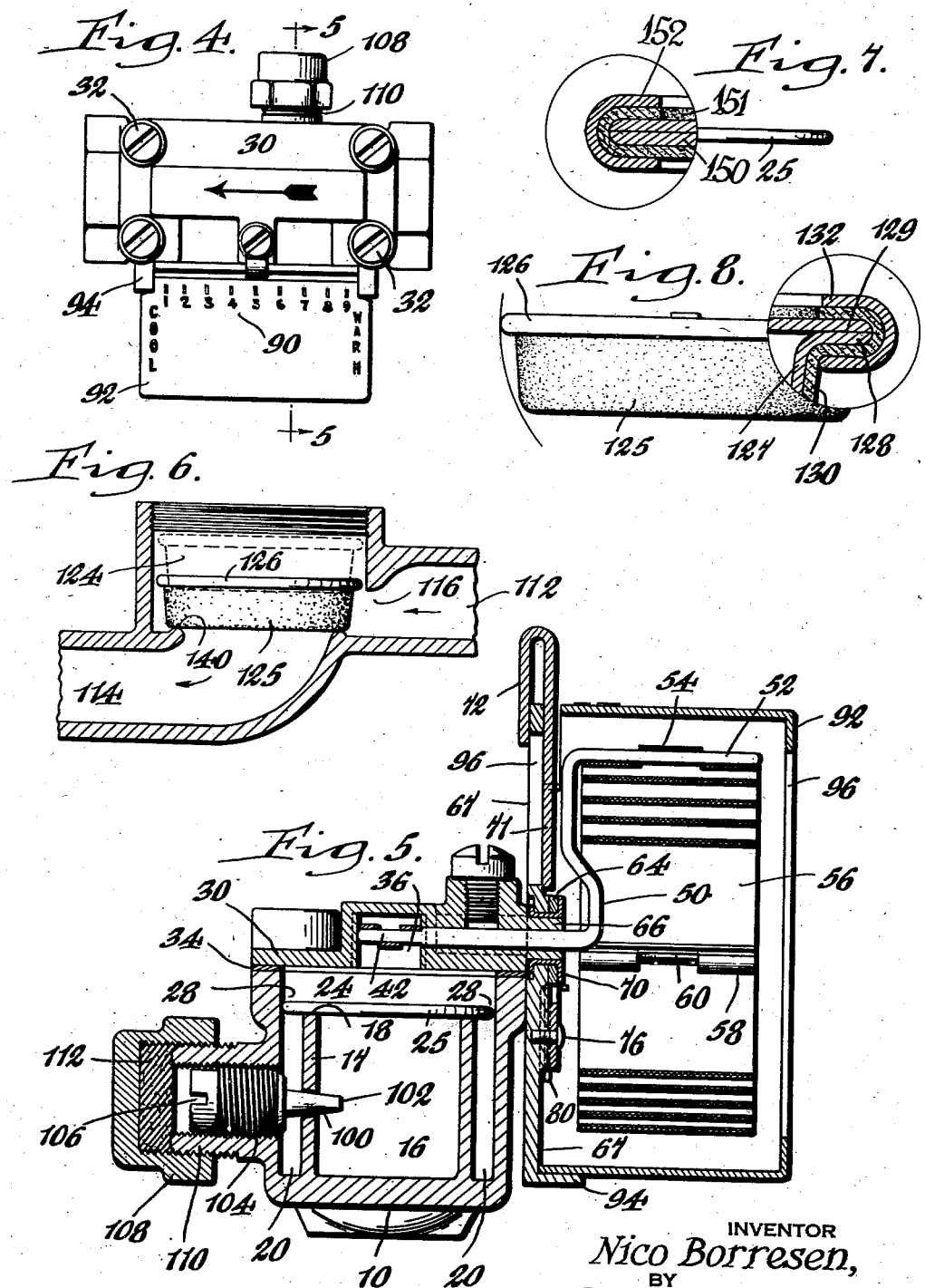

Patented Apr. 29, 1941

2,240,435

UNITED STATES PATENT OFFICE 2,240,435

THERMOSTAT VALVE

Nico Borresen, Buffalo, N. Y., assignor to Nicostat Products Co., Buffalo, N. Y.

Application July 2, 1937, Serial No. 151,723

4 Claims. (Cl. 236—80)

This invention relates to valves for controlling the flow of fluids, and particularly to thermostatically controlled valves for automatically controlling the flow of fluids in accordance with variations in temperatures.

It is essential that valves for automatically controlling the flow of fluids such as gaseous fuels must be quickly responsive to slight variations in temperature or other control mediums. It is also important that such valves operate with the highest degree of accuracy and in a positive manner, and it is an object of the invention to provide an improved valve structure adapted for connection in a fluid conduit in which an auxiliary valve operable by external means controls a cumulative pressure differential upon the opposite sides of a main valve member whereby the pressure of the fluid in the conduit actuates the main valve member to open or closed positions.

Another object of the invention is to provide an improved thermostatic valve actuating mechanism capable of operating efficiently under a wide range of temperature condition adjustments.

Another object of the invention is to provide a valve for the purpose described which is capable of functioning with equal facility when supported in any position, without being appreciably affected in its operation by the disposition of gravitational forces.

Another object of the invention is to provide a valve mechanism for controlling the flow of fluid through a conduit comprising an auxiliary valve member adapted to be moved by external actuating means toward open and closed positions and means for quickly establishing a fluid pressure differential on reverse sides of a primary valve member in response to the attainment of an open or closed position of the auxiliary valve, whereby the primary valve member is actuated to an open or closed position relative to the fluid conduit with an instantaneous and positive action, by virtue of forces of the controlled fluid.

The invention is exemplified in a construction embodying a valve casing provided with inlet and outlet ports for connection with conventional forms of fluid-carrying conduit, and inlet and outlet chambers within the casing adapted to direct fluid from the conduit toward and away from a valve seat portion of the casing. A primary valve of the disc type is disposed in freely movable relation in a pressure chamber adjoining the inlet and outlet chambers for movement toward and away from the valve seat in response to pressure-differentials upon opposite sides of the valve disc. A by-pass port is formed through a wall of the pressure chamber for communication with the outlet port of the valve casing, and an externally operated auxiliary valve is arranged to operate in connection with the by-pass port to alter the pressure differential conditions on opposite sides of the primary valve in response to the action of a thermostat mechanism employing a temperature-responsive bimetal element. The primary valve member is of particularly light weight construction so that the mechanism may be arranged in any position in connection with a pipe line; gravitational forces acting upon the primary valve member being insufficient to interfere with the proper actuation of the valve by fluid pressure differential conditions on opposite sides of the valve.

Adjustment means for varying the relative positions of the opposite ends of the bimetallic element of the thermostat are provided, to suit the device to operate under different temperature conditions. Adjustable fluid by-pass means in the valve casing is provided to permit constant flow of small quantities of fluid therethrough for purposes such as for example providing a pilot light in connection with gas burners wherein a small flame is desired to be left burning when the main valve is closed.

In the drawings:

Fig. 1 is a longitudinal section through a mechanism embodying the invention showing the primary and auxiliary valves in closed positions;

Fig. 2 is a disassembled view of parts of the thermostat control mechanism thereof;

Fig. 3 is a diagrammatic fragmentary sectional view illustrating the flow of fluid through a portion of the device, the primary valve being in an open position;

Fig. 4 is a plan of the device shown in Fig. 1;

Fig. 5 is a transverse section taken substantially along line 5—5 of Fig. 4;

Fig. 6 is a fragmentary sectional view showing another form of primary valve and casing construction;

Fig. 7 is a view partly in elevation and partly in section on a magnified scale of the form of primary valve construction shown in Figs. 1, 3 and 5;

Fig. 8 is a view, partly in elevation and partly in section on a magnified scale, of the form of primary valve construction shown in Fig. 6.

Referring particularly to Figs. 1, 3 and 5, a valve casing 10 is provided with inlet and outlet ports 12 and 14 respectively, which are threaded for connection with conventional pipe or tubing for conducting fluid to and from the valve mechanism. Interiorly of the casing 10 is provided an L shaped outlet chamber 16 having a longitudinally extending section in open communication with the outlet port 14 and a transversely extending section defined by a cylindrical wall 17 terminating in an annular valve seating end portion 18. An inlet chamber 20 in open communication with the inlet port 12 terminates in an annular shaped section embracing the cylindrical wall 17 of the outlet chamber.

A circular pressure-accumulating chamber 24 is provided in the casing 10 above and concentrically with the valve seat 18, and is of a diameter substantially equal to that of the adjacent portion of the inlet chamber and greater than the outside diameter of the valve seat 18. A primary valve 25 of disc-like form, adapted to rest against the valve seat 18 and to extend beyond the marginal edges thereof within the confines of the pressure chamber 24, conforms to the general shape of the pressure chamber 24 but is of slightly lesser diameter, thus providing a small clearance gap 28 between the marginal edge of the valve and the wall of the pressure chamber. Thus, the valve 25 is free to float in the pressure chamber under the sole influence of fluid pressures upon its opposite sides.

A cover member 30 for the casing 10 is maintained in assembled relation thereon by means of screws 32, and provides a closure for the upper end of the pressure chamber 24. A sheet gasket 34 is provided to make the juncture fluid tight. A conduit 36 in the form of a longitudinally extending recess in the bottom portion of the cover 30 is in open communication with the pressure chamber 24 and with a by-pass port 40 formed through the wall of the outlet chamber 16.

An auxiliary valve mechanism comprising a valve 38 and supporting lever arm 41 is housed for oscillating movement in the conduit 36 upon a pivot arm 42 which is rotatably mounted in the cover member 30. The lever arm 41 is provided at one end with forked fingers 44 for pivotally engaging a ball-shaped boss 45 extending from one side of the valve 38 for moving the opposite or valve-seating side of the valve toward and away from contact with the upper end of the by-pass port 40 in response to opposite rotative movements of the arm 42. The opposite end of the lever arm 41 is provided with a counter-weight 46 to balance the weight of the auxiliary valve unit. The casing 10 is counterbored as at 48 to provide a definitely defined annular seat for the valve 38.

The pivot arm 42 is formed at its outer end with a crank portion 50 and a parallel finger 52 for engagement with an eye 54 formed on the outer end of a spiral bi-metal thermostat element 56. The opposite inner end of the thermostat 56 is provided with an eye 58 for engagement with a pin 60 extending laterally from an arm 62 which is pivotally mounted by means of an eye portion 64 about a boss 66 extending from the cover 30 concentrically of the pivot arm 42.

A plate 67 is mounted against the side of the cover 30 by means of screws 68 passing through arcuate slots 69 in the plate 67, and a ferrule 70 is mounted upon the plate 67 through an aperture therein for retaining the arm 62 in operative position upon the plate 67 in concentric relation to the boss 66 of the cover.

A lever arm 71 provided at its upper end with a finger piece 72 is pivotally mounted by means of an aperture 74 in its lower end, upon a pin 76 extending from the back plate 67. The arm 71 is provided with a cam portion 78 extending beyond its point of pivotal connection on the pin 76; the upper edge of the cam portion 78 being adapted to bear against the lower edge of the arm 62 in sliding relation thereagainst and at a point spaced from the pivotal connection of the arm 62 upon the plate 67. A coil spring 80, having one end connected as at 82 to the cam portion 78 and its other end connected as at 84 to the arm 62 is provided to maintain the arm 62 against the cam member 78 without interferring with camming movements therebetween. Thus, movement of the finger piece 72 to the right or left from a centrally upright position as shown in Figures 1 and 2, will cause the camming portion 78 to be moved in an arcuate path having substantial vertical components of motion, thus causing the arm 62 to be partially rotated about its pivot connection upon the plate 67 and about the boss 66. Thus the finger 60 extending from the arm 62 is caused to move the inner end of the thermostat 56 toward or away from the center of the spiral, as the case may be, thereby increasing or decreasing the tension being exerted through the thermostat 56 by reason of its natural resiliency. There is thus provided a simple and effective adjustment means for controlling the position of the auxiliary valve relative to its seat, and the degree of tension thereon which is capable of fine adjustment without lost motion in either direction of adjustment. Also, the arcuate slots 69 in the back plate 67 provide additional adjustment means whereby the screws 68 may be loosened and the plate 67 rotated about the axis of the bar 42 to alter the angular relation between the thermostat adjusting mechanism and the finger 52, thus shifting the range of adjustability to higher or lower temperature regions.

As illustrated particularly in Fig. 3, when the device is functioning with the primary valve in an open position, the valve 25 is floating freely in the pressure chamber 24 and at a position spaced from the valve seat portion 18, whereby the fluid moving through the device has ample passageway room between the valve disc and the valve seat. The incoming fluid flows through the inlet chamber 20 and thence upwardly and around about the circular wall 17 of the outlet chamber 16. It is thus directed against the outer marginal portion of the under side of the valve 25 and is thereby deflected and reversed in its direction of flow toward the center and downwardly into the outlet chamber 16. In accordance with laws controlling the flow of fluids, a swirling or vortex action is set up in the fluid as it moves inwardly from all directions toward the center of the outlet chamber and downwardly therethrough; and a region of partial vacuum is thus created at a position adjacent the center of the under side of the valve 25. Thus the valve 25 is supported in the position shown by a balance of dynamic and static fluid forces, comprising upwardly directed dynamic forces resulting from impingement of the fluid against the under side of the valve, and downwardly directed vacuum forces adjacent the under side of the center of the valve disc and static fluid pressure forces upon the upper side of the valve disc.

When the auxiliary valve disc 38 is moved to a closed position relative to the port 40, such as by the thermostat 56 in response to a temperature change which affects the shape of the spiral in accordance with well known principles of thermostat operation, the momentum of the flow of fluid through the inlet chamber 20 and upwardly toward the valve disc 25 causes a momentary continuation of fluid flow through the gap 28 between the valve 25 and the walls of the pressure chamber 24. Since the outlet port 40 is now closed this produces a sudden increase of static pressure in the pressure chamber 24 above the valve 25, thus disrupting the previous balance of forces acting upon the valve 25 and creating a differential in favor of the forces above the valve. The valve 25 therefore moves toward a seated position, and as this movement takes place the valve 25 cuts off a portion of the former flow of fluid into the outlet chamber 16. The momentum of the fluid in the line beyond the outlet port of the device produces a momentary reduction of static fluid pressure in the outlet chamber 16 which further unbalances the forces formerly maintaining the valve 25 in an open position. Thus the valve 25 is urged toward a seated position with a progressively increasing differential of forces, and is finally impelled against the valve seat 18 with a positive snap-like action. Once it has assumed a seated positon the static fluid pressure of the inlet end of the line operates against the upper surface of the valve disc 25 to maintain it in a seated position inasmuch as the outlet end of the fluid line is in open communication with the atmosphere and under a comparatively reduced static pressure condition.

Whenever the auxiliary valve 38 is moved to an open position relative to the port 40, the fluid reposing in the pressure chamber 24 and the conduit 36 seeks an even pressure level with that of the outlet conduit 16. Due to the fact that the gap 28 between the valve 25 and the adjacent walls of the pressure chamber 24 is restricted in sectional area fluid moves through the conduit 36 and the port 40 into the outlet at a rate greater than that of incoming fluid through the gap 28. Thus the pressure against the upper surface of the valve 25 is relieved, and since a flow of fluid is now taking place through the inlet chamber 20 toward and around the valve 25, a dynamic or impingement pressure against the under side of the valve 25 is added to the inlet static pressure, thus overcoming the reduced pressure against the upper side of the valve 25 and causing the valve to move away from the seat 18. As the volume of fluid flow through the device increases the dynamic pressure against the underside of the valve, being a function of the fluid velocity, likewise increases, and causes the valve 25 to move away from the valve seat 18 to a position allowing full flow of fluid through the device. Thus, a valve construction is provided which when in an open position presents no material restriction to the flow of fluid therethrough and hence causes no undesirable pressure drop by reason of its presence in the line.

When the valve 25 reaches its proper open position the rush of fluid downwardly into the outlet chamber sets up a vacuum force adjacent the underside of the valve to balance the forces on the valve and causes it to float in proper position and within range of the vacuum of the vortex so that when the auxiliary valve is closed the primary valve will be instantaneously affected and be caused to move toward a closed position regardless of the position of the device in the fluid line and the direction of forces of gravity upon the valve 25. While I have described and illustrated a temperature responsive thermostat of spiral coil spring type for actuating the auxiliary valve 38, it is obvious that the principles of this invention may be utilized in connection with any other form of actuating means, such as an electric solenoid, or manually operated means.

A dial or indicator denoting the setting of the thermostat may be employed, and as illustrated herein comprises a series of numerals 90 formed upon the top of a housing 92 constituting a covering for the thermostat and actuating means. The housing 92 is supported in a position of cooperation with the back plate 67 by means of a laterally extending flange 94 formed integral with the marginal edge thereof. The back plate 67 and the housing 92 are preferably provided with openings 96 therethrough so as to permit the surrounding atmosphere to readily contact the thermostat 56.

As illustrated in Figure 5, an opening 100 may be provided through the wall 17 of the outlet chamber to provide a constant by-pass for a small amount of fluid through the device, such as for the purpose of a pilot light when used in fuel lines. A needle valve 102, threaded into a wall of the casing as at 104 may be provided with a screw driver slot 106 for adjustments to regulate the quantity of fluid flow through the by-pass 100. A cap 108 threaded upon a nipple 110 concentric of the needle valve 102 and provided with a gasket 112 seals the needle valve opening and prevents the escape of fluid therethrough.

In Fig. 6 another form of casing and primary valve construction is illustrated wherein the primary valve 125 comprises a body portion of generally cylindrical shape, and a cap portion 126 defining a flange-like projection extending laterally about the upper end of the body portion. As illustrated particularly in Figure 8, the valve is constructed with particular attention to lightness of construction and comprises a cup-like frame member 127 formed with a laterally extending flange 128 for bearing against a circular plate 129. A soft leather or other fibrous material covering 130 is arranged to cover the bottom and sides of the cup 127, and to extend in wrapped relation about the marginal edges of the flange 128 and the top plate 129. A U-shaped annular ferrule 132 is mounted about the marginal edge thereof to clamp and maintain the members of the valve in assembled relation. For use in connection with this form of valve, the casing of the device is preferably shaped as shown in Figure 6 with inlet and outlet ports 112 and 114 respectively arranged in substantially diametrically opposed relation, whereby the course of fluid through the device is substantially in a straight line as compared to the direction of flow through the form of construction illustrated in Figures 1 and 3. The primary valve is shown in solid lines as arranged in closed position upon an annular flange-like valve seat 140, in which position it prevents flow of fluid through the device. Upon movement of the valve to the open broken line position, the inlet port 116 is unobstructed by the presence of the primary valve, and hence a full flow of fluid is permitted, and in a substantially straight line direction.

The cap member 126 of the valve cooperates with the walls of the chamber 124 in a manner identical to that in which the valve 25 shown in Figures 1 and 3 functions. Thus, the valve 125 may be used in connection with the other features of the invention in an identical manner, with the exception that a substantially straight line flow of fluid through the device is hereby obtained. The hollow fabricated construction of the valve provides a feather weight valve member which is subject to actuation by differential fluid pressures without interference by forces of gravity.

As illustrated particularly in Figs. 7 and 8, the marginal edges of the valve 25 and of the cap piece 126 of the valve 125 are of sharply rounded form to prevent binding of these members against adjacent wall portions of the pressure chamber. For the same reason, the lower body portion of the valve 125 is also restricted in lateral extent to dimensions within a circle described by a radius struck from the center of the cap piece 126 and of a length equal to the radius thereof.

The main valve 25 may consist of a single piece of sheet material, or as illustrated in Fig. 7 it may be fabricated to comprise a thin body plate 150 of aluminum or other light weight material; a soft calf skin or other fibrous material covering 151; and a clamping ring 152 forming the marginal edge of the valve and maintaining the parts in assembled relation. The covering 151 is preferably incorporated in the structure when the device is to be used to control thin fluids such as gases, and whenever it is desirable to provide a positive sealing action of the valve when closed, such as in connection with the control of inflammable gases. In any case, the structure of the valve 25 is made feather-light in weight, so that the mechanism functions perfectly without regard to the attitude in which the unit may be installed in connection with a fluid conduit and regardless of the direction in which the forces of gravity act upon the valve disc 25.

Although only one form of the invention has been shown and described in detail, it will be apparent to those skilled in the art that the invention is not so limited but that various changes can be made therein without departing from the spirit of the invention or from the scope of the appended claims.

I claim:

1. In a fluid control valve, a casing, a wall within said casing defining adjacent inlet and outlet chambers and a primary valve seat therebetween, a static fluid pressure chamber in said casing adjacent said valve seat, a primary valve freely movable in said static pressure chamber for opening or closing said valve seat portion under the influence of combined static and dynamic fluid pressure force differentials upon opposite sides of the primary valve, a port between said static pressure chamber and said fluid outlet chamber and an auxiliary valve for opening and closing said port to alternately provide pressure differential conditions on opposite sides of said primary valve, and means for actuating said auxiliary valve comprising a shaft pivotally mounted in said casing and provided at one end with a crank arm for engagement with said auxiliary valve, and a crank arm at the opposite end of said shaft for engagement with one end of a spiral thermostat element, a third crank arm engaging the other end of said spiral thermostat element and pivotable about a bearing in line with the center of said spiral thermostat element and said shaft, a manually operable lever adapted to cam said third mentioned crank member to various radial positions for adjustment of said thermostat element to vary the temperature condition required to close said auxiliary valve.

2. In a fluid control valve mechanism, a casing, a fluid port through said casing, a valve seat portion formed on said casing adjacent said fluid port, a valve for closing said fluid port, means for moving said valve toward opened or closed position relative to said port, said valve actuating means comprising a shaft pivotally mounted on said casing, a cross-arm fixedly mounted upon said shaft intermediate thereon, one end of said cross-arm being connected to said valve, thermostatic means connected to said shaft for actuation of said shaft in response to temperature changes, and counter balancing means upon the other end of said cross-arm for equalizing the forces of gravity exerted upon the valve actuating means.

3. In a fluid flow control device, a fluid inlet conduit portion, an inlet chamber disposed in directional continuity with said inlet conduit and having an opening through a side wall portion thereof, said opening leading into an outlet chamber contiguous to said inlet chamber, an outlet conduit portion in open communication with said outlet chamber and extending in directionally parallel relation with respect to said inlet conduit portion, the marginal edge portion of said chamber wall adjacent said opening defining a valve seat, a primary valve in said inlet chamber adapted to move toward and away from said valve seat to regulate the flow of fluid through said device, a fluid static pressure chamber in open communication with said inlet chamber and adapted to accommodate said primary valve in free floating relation therein when said valve is away from said valve seat, an auxiliary conduit leading between said outlet conduit and said pressure chamber at the end portion thereof opposite said valve seat, said primary valve being of hollow form and light weight and comprising reduced valve seat contacting and intermediate body portions and an enlarged cap portion adapted to fit within said pressure chamber in fluid leaking relation, an auxiliary valve adapted to close said auxiliary conduit, and means for moving said auxiliary valve to and from auxiliary conduit closing position to vary the static fluid pressure within said pressure chamber behind said primary valve.

4. In a fluid flow control device, fluid inlet and outlet chambers adjacent one another and defining a valve seat portion therebetween, a fluid static pressure chamber in open communication at one end with said inlet chamber and provided at its other end with a reduced recess leading into an auxiliary fluid conduit in communication with said outlet chamber, a primary valve of hollow form and light weight freely movable within said inlet chamber toward and away from said valve seat and so formed as to be unable to seal said pressure chamber reduced recess from said inlet chamber, an auxiliary valve member adapted to close said auxiliary conduit and disposed in said recess, and means for moving said auxiliary valve to and from closed positions relative to said auxiliary conduit to vary the static fluid pressure within said pressure chamber, whereby said primary valve is actuated by combined dynamic and static fluid pressure differentials upon opposite sides thereof toward open and closed positions and is prevented from blocking said auxiliary conduit irrespective of the disposition of gravitational forces relative to the moving parts of said device.

NICO BORRESEN.